United States Patent
Wight et al.

(10) Patent No.: US 6,635,747 B2
(45) Date of Patent: Oct. 21, 2003

(54) DYES, INKS AND THEIR USE IN INK-JET PRINTING

(75) Inventors: Paul Wight, Manchester (GB); Prakash Patel, Manchester (GB)

(73) Assignee: Avecia Limited, Manchester (GB)

( * ) Notice: Subject to any disclaimer, the term of this patent is extended or adjusted under 35 U.S.C. 154(b) by 17 days.

(21) Appl. No.: 10/181,911

(22) PCT Filed: Jan. 30, 2001

(86) PCT No.: PCT/GB01/00354

§ 371 (c)(1),
(2), (4) Date: Jul. 24, 2002

(87) PCT Pub. No.: WO01/59012

PCT Pub. Date: Aug. 16, 2001

(65) Prior Publication Data

US 2003/0120047 A1 Jun. 26, 2003

(30) Foreign Application Priority Data

Feb. 9, 2000 (GB) .............................. 0002902

(51) Int. Cl.$^7$ .................... C09B 43/16; C09D 11/02
(52) U.S. Cl. .................... 534/803; 8/639; 106/31.48; 427/466; 428/195; 347/86
(58) Field of Search .............. 534/803; 8/639; 106/31.48; 427/466; 428/195; 347/86

(56) References Cited

U.S. PATENT DOCUMENTS

| | | | | |
|---|---|---|---|---|
| 4,447,357 A | * | 5/1984 | Holzle et al. ............ | 534/634 |
| 4,777,248 A | * | 10/1988 | Greenwood ............ | 534/803 |
| 6,514,329 B1 | * | 2/2003 | Carr et al. ............ | 106/31.48 |
| 6,517,620 B1 | * | 2/2003 | Carr et al. ............ | 106/31.48 |

FOREIGN PATENT DOCUMENTS

| | | |
|---|---|---|
| EP | 0 036 838 | 9/1981 |
| EP | 0 187 520 | 7/1986 |
| GB | 2 317 184 | 3/1998 |
| JP | 61-2760 | 1/1986 |
| WO | WO 94 16021 | 7/1994 |

OTHER PUBLICATIONS

K. Miura et al, *Chemical Abstracts*, vol. 106, No. 10, Feb. 9, 1987, Naphthalene Disazo Compounds, Abstract No. 34600t.

* cited by examiner

Primary Examiner—Fiona T. Powers
(74) Attorney, Agent, or Firm—Morgan, Lewis & Bockius LLP

(57) ABSTRACT

A compound of the Formula (1) and salts thereof:

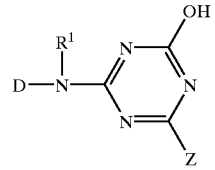

Formula (1)

wherein:
D is the residue of a mono-azo chromophore;
Z is an optionally substituted nitrogen containing heterocyclic group;
R$^1$ is H or optionally substituted alkyl;
the dyes of Formula (1) being free from fibre reactive groups;

provided that the compound of Formula (1) is other than the compound of Formula (A):

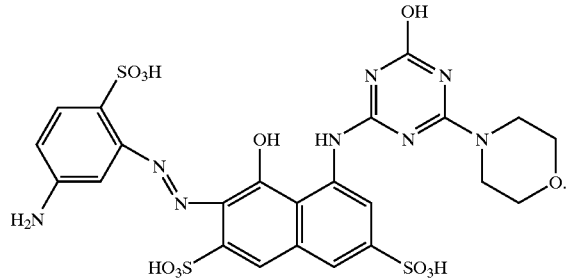

Formula (A)

Also claimed are compositions and inks containing a compound of Formula (1), a process for ink jet printing using the inks and to an ink jet printer cartridge containing the ink.

17 Claims, No Drawings

DYES, INKS AND THEIR USE IN INK-JET PRINTING

This invention relates to dyes, to inks and to their use in ink jet printing ("IJP").

IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to a first aspect of the present invention there is provided a mono-azo compound of Formula (1) and salts thereof:

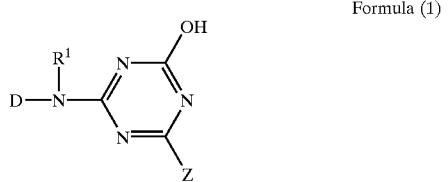

Formula (1)

wherein:
D is the residue of a mono-azo chromophore;
Z is an optionally substituted nitrogen containing heterocyclic group;
$R^1$ is H or optionally substituted alkyl;
the dyes of Formula (1) being free from fibre reactive groups;
provided that the compound of Formula (1) is other than the compound of Formula (A):

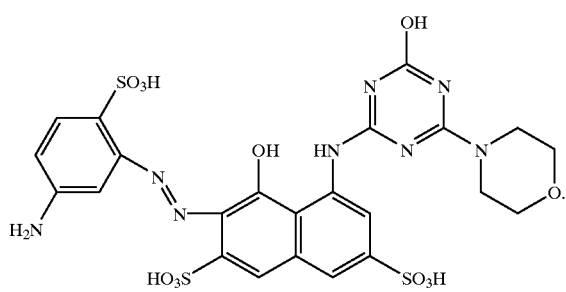

Formula (A)

$R^1$ is preferably H or optionally substituted $C_{1-4}$-alkyl, more preferably H or $C_{1-4}$-alkyl optionally substituted by hydroxy, carboxy, sulpho or cyano. Examples include methyl, ethyl, n-propyl, iso-propyl, hydroxyethyl, cyanoethyl, sulphopropyl and carboxyethyl. It is especially preferred that $R^1$ is H.

The nitrogen containing heterocyclic group represented by Z is preferably attached to the triazine ring in Formula (1) by a bond to a nitrogen atom in the heterocyclic group.

Z may contain more than one nitrogen atom. Z may also contain other heteroatoms in addition to nitrogen, for example one or more sulphur or oxygen atom(s).

Z may be a monocyclic or polycyclic nitrogen containing heterocyclic group which may be saturated, unsaturated or aromatic. It is preferred however that Z is a bicyclic or, more preferably, a monocyclic nitrogen containing heterocyclic group. It is especially preferred that Z is a 6 or more especially a 5 membered monocyclic nitrogen containing heterocyclic group.

Preferably Z is free from primary and secondary amino groups because we have found that the presence of such groups reduces the light-fastness of the compounds of Formula (1).

Preferred groups represented by Z include morpholino, pyrrolyl, imidazolyl, isoindolyl, indazolyl, pyrazolyl, pyrrolidinyl, pyrrolinyl, imadazolidinyl, imidazolinyl, pyrazolidinyl, pyrazolinyl, piperidino, piperazinyl, indolinyl, isoindolinyl, isothiazolinone, benzisothiazolinone or tetrahydroisoquinolinyl each of which is optionally substituted.

Preferred optional substituents on Z include sulpho, carboxy, halogen (preferably chloro) alkoxy (preferably $C_{1-6}$-alkoxy) or alkyl ((preferably $C_{1-6}$-alkyl) optionally substituted by hydroxy, carboxy or sulpho. Especially preferred optional substituents on Z are $C_{1-4}$-alkyl, carboxy or sulpho.

It is especially preferred that Z is morpholino or pyrrolidinyl optionally substituted by $C_{1-4}$-alkyl, carboxy or sulpho.

The mono-azo group represented by D contains one azo group (—N=N—). Preferably D is a group of the Formula (2):

Formula (2)

wherein:
Ar is optionally substituted aryl or optionally substituted heteroaryl; and
L is optionally substituted arylene.

Preferred groups represented by Ar contain up to 20, more preferably up to 15 and especially up to 12 carbon atoms.

When Ar is optionally substituted aryl it is preferably optionally substituted phenyl, optionally substituted naphthyl or optionally substituted indanyl.

When Ar is optionally substituted heteroaryl it is preferably optionally substituted pyrazolonyl, optionally substituted pyridonyl (especially optionally substituted hydroxypyridonyl), optionally substituted thiophenyl, optionally substituted thiazolyl or optionally substituted benzisothiazolyl.

Preferably Ar is optionally substituted phenyl or optionally substituted naphthyl.

Preferred optional substituents on Ar include halogen (especially F and Cl), nitro, cyano, —$CF_3$, —$OR^2$, —$SR^2$, —$NR^3R^4$, —$C(O)R^5$, —$C(O)OR^6$, —$SO_2R^7$, —$SOR^8$ or $C_{1-6}$-alkyl optionally substituted by —OH, —$SO_3H$, —COOH, —$PO_3H_2$, $C_{1-4}$-alkoxy or hydroxy-$C_{1-4}$-alkyleneoxy;
wherein:
$R^2$ is H, $C_{1-6}$-alkyl optionally substituted by —OH, —$SO_3H$ or —COOH, or phenyl optionally substituted by $C_{1-4}$-alkyl, —OH, —$SO_3H$, —COOH, —$NH_2$ or —$NO_2$;
$R^3$ and $R^4$ are each independently H, —CO($C_{1-6}$-alkyl), —$CONH_2$, $C_{1-6}$-alkyl optionally substituted by —OH, —$SO_3H$ or —COOH, or phenyl optionally substituted by $C_{1-4}$-alkyl, —OH, —$SO_3H$, —COOH, —$NH_2$ or —$NO_2$; or $R^3$ and $R^4$ together with the nitrogen to which they are attached form a 5- or 6-membered ring (preferably morpholine or piperazine); and $R^6$, $R^7$, $R^8$ and $R^9$ are each independently $C_{1-6}$-alkyl or phenyl.

Especially preferred optional substituents on Ar include one or more of $C_{1-4}$-alkyl, $C_{1-4}$-alkoxy, —OH, —COOH, —PO$_3$H$_2$, —SO$_3$H, nitro, —Cl, —F, —CF$_3$, amino and —COOC$_{1-4}$-alkyl.

Preferred examples of groups represented by Ar include 2-carboxyphenyl, 3,5-dicarboxyphenyl, 2-sulphophenyl, 3-sulphophenyl, 2-carboxy-4-sulphophenyl, 3,4-dimethyl-6-sulphophenyl, 4-amino-2-hydroxyphenyl, 4-carboxy-2-hydroxyphenyl, 1,5-disulphonaphth-2-yl, 1-sulphonaphth-2-yl, 3,6,8-trisulphonapth-2-yl, 8-hydroxy-2,4-disulphonaphth-1-yl, 1-amino-8-hydroxy-3,6-disulphonaphth-2-yl, 2-amino-8-hydroxy-6-sulphonaphth-1-yl, 2-amino-8-hydroxy-6-sulphonaphth-7-yl, 2-amino-8-hydroxy-3,6-sulphonaphth-1-yl or 6-sulpho-indan-5-yl.

Preferably L is optionally substituted phenylene or optionally substituted naphthylene. Preferred optional substituents on L are the preferred optional substituents as hereinbefore described in relation to Ar.

When L is optionally substituted phenylene it is preferably a group of the Formula (3):

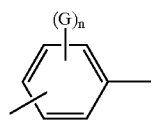

Formula (3)

wherein:

G is sulpho, carboxy, optionally substituted alkyl, optionally substituted alkoxy, —CF$_3$ or —PO$_3$H$_2$; and n is 0 to 4.

Preferably G is —SO$_3$H, —COOH, —CF$_3$, optionally substituted $C_{1-4}$-alkyl, optionally substituted $C_{1-4}$-alkoxy or —PO$_3$H$_2$, more preferably —SO$_3$H, —COOH or —CF$_3$ and especially —SO$_3$H. Preferred optional substituents on G are selected from —OH, —SO$_3$H, —COOH and —NH$_2$, more preferably —OH.

n is preferably 0, 1 or 2, more preferably 1 or 2 and especially 1.

It is especially preferred that when L is of the Formula (3) it is a 1,4-phenylene group optionally carrying a substituent represented by G at the ortho position relative to the azo group in Formula (2).

When L is optionally substituted naphthylene it is preferably of the Formula (4):

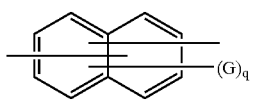

Formula (4)

wherein:

G is as hereinbefore defined; and q is 0 to 4.

Preferably q is 1 to 4. Preferably the group of Formula (4) carries at least one, more preferably two sulpho group(s). It is especially preferred that the compound of Formula (4) is of the Formula (5):

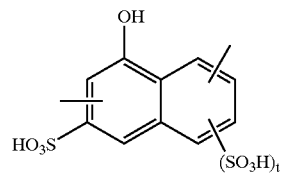

Formula (5)

wherein:

t is 0 or 1.

When t is 1 in Formula (5) the sulpho group is preferably attached at the 4- or more preferably the 3-position in the naphthylene ring. Preferably the azo group is attached at the 7-position of the naphthylene ring in Formula (5).

In a preferred embodiment L is a naphthylene group, preferably a group of the Formula (5) as hereinbefore described.

It is especially preferred that the compound of Formula (1) is magenta in colour.

In view of the foregoing preferences the compound of Formula (1) is preferably a compound of the Formula (6) or a salt thereof:

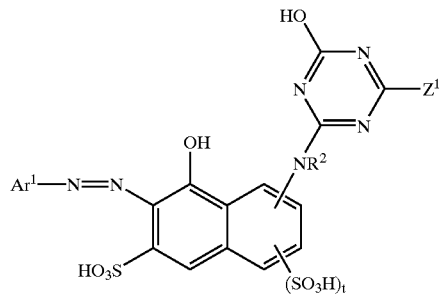

Formula (6)

wherein:

Ar$^1$ is optionally substituted phenyl or optionally substituted naphthyl;

Z$^1$ is an optionally substituted nitrogen containing heterocyclic group which is attached to the triazine ring by a bond to a nitrogen atom in the heterocyclic group;

R$^2$ is H or $C_{1-4}$-alkyl optionally substituted by —OH, —COOH or —SO$_3$H; and t is 0 or 1.

Preferably Z$^1$ is as hereinbefore defined for Z except the heterocyclic group is attached to the triazine ring in Formula (6) by a bond to a nitrogen atom in the heterocyclic group. More preferably Z$^1$ is an optionally substituted 5 or 6 membered heterocyclic group. It is especially preferred that Z$^1$ is free from primary or secondary amino groups. More especially Z$^1$ is morpholino or pyrrolidinyl each of which is optionally substituted by $C_{1-4}$-alkyl, carboxy or sulpho.

Preferred optional substituents on Ar$^1$ are as hereinbefore defined in relation to Ar. It is especially preferred that Ar$^1$ is phenyl or naphthyl each of which is optionally substituted by one or more of —OH, —SO$_3$H, —COOH, —NH$_2$, $C_{1-4}$-alkyl, $C_{1-4}$-alkoxy or nitro.

When t is 1 the floating sulpho group in Formula (1) is preferably attached at the 3- or 4-position in the napthylene ring. More preferably t is 1 and the floating sulpho group is attached at the 3-position.

The compounds of Formula (6) provide prints which exhibit a high light-fastness and good water-fastness when incorporated into inks for ink jet printing. The compounds of Formula (6) are also highly soluble which improves operability and reduces crusting and nozzle blockage when inks containing the compounds are used in an ink jet printer.

Compounds of the present invention Formula (1) are free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulphonyl groups which contain a sulphate ester group in beta-position to the sulphur atom, e.g. beta-sulphato-ethylsulphonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring.

The compounds of the invention may be in the free acid or salt form. Preferred salts are water-soluble, for example alkali metal salts, especially lithium, sodium and potassium salts, ammonium, substituted ammonium and mixed salts thereof. Preferred alkali metal salts are those with sodium or lithium. It is especially preferred that the compound is in the form of a mixed lithium sodium salt, because we have found that these salts provide prints which exhibit a high light-fastness when incorporated into an ink jet printing ink.

Preferred ammonium and substituted ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6-membered ring (preferably a morpholinyl, pyridinyl or piperidinyl ring).

Preferably each V independently is H or $C_{1-4}$-alkyl, more preferably H, $CH_3$ or $CH_3CH_2$, especially H. Thus the cation is preferably ammonium (i.e. $^+NH_4$).

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

The compounds may be converted into a salt using known techniques. For example, an alkali metal salt of a compound may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis.

The present invention covers all tautomeric forms of the dyes shown in this specification, for example the hydrazo tautomers.

The compounds of the invention may be prepared using conventional techniques for the preparation of azo dyes. For example a suitable method comprises hydrolysing a compound of the Formula (7):

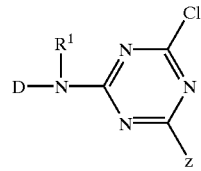

Formula (7)

wherein D, Z and $R^1$ are as hereinbefore defined.

The hydrolysis is preferably performed by heating the compound of Formula (7) in an aqueous medium. Preferably the hydrolysis is performed under alkaline conditions, more preferably a pH in the range 8 to 14. The temperature during hydrolysis is preferably from 30 to 95° C., more preferably from 40 to 90° C. The efficiency of the hydrolysis may be improved by using a suitable catalyst, for example in the presence of a catalytic quantity of 1,4-diazabicyclo[2.2.2]octane (DABCO).

After the condensation reaction the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

Unwanted anions may be, and preferably are removed from the product of the above process by dialysis, osmosis, ultrafiltration or a combination thereof.

The product of the above process may be converted to a salt by conventional techniques as hereinbefore described.

The compound of the Formula (7) may be prepared by, for example:

(i) condensing a compound of the formula $DNHR^1$ with an approximately molar equivalent of cyanuric chloride; and (ii) condensing the product of stage (i) with a compound of the formula ZH;

wherein D, $R^1$ and Z are as hereinbefore defined.

Preferably the condensation in stage (i) is performed at a temperature of 5° C. or less. It is preferred that the pH during the condensation is maintained above 5.5, more preferably above pH 6.

The condensation in stage (ii) is preferably performed at room temperature (20–30° C.). Preferably the pH during the condensation is maintained in the range of from pH 7 to 8.5.

The compound of the formula $DNHR^1$ may be prepared using conventional techniques for the preparation of azo dyes. For example when D is of the hereinbefore Formula (2):

Formula (2)

the compound may be prepared, for example by diazotising a compound of the formula $ArNH_2$ and coupling with a compound of the formula $LNHR^1$ using conventional techniques.

The present invention also covers mixtures comprising two or more compounds of the Formula (1). Furthermore, the compounds of Formula (1) may be mixed with commercially available dyes, especially those listed in the Colour Index International, to adjust the shade or other properties as desired.

According to a second aspect of the present invention there is provided a composition comprising:

(a) one or more compound according to the first aspect of the present invention (especially a magenta coloured compound); and (b) one or more water-soluble magenta dye other than a compound according to the first aspect of the invention.

The water-soluble magenta dye is preferably a xanthene dye, an azo or bis azo dye, more preferably an anionic azo or bis azo dye and especially an azo or bis azo dye which contains one or more groups selected from sulphonate, carboxylate and thiocarboxylate groups.

Preferred water-soluble magenta dyes include C.I. Acid Red 50, 52, 87, 91, 92, 95, 249 and 289; C.I. Direct Violet 106 and 107; compounds 100 to 107, 200 and 201 described on pages 8 and 9 of WO96/24636; compounds 1 to 24 shown described on cols. 4 to 10 in U.S. Pat. No. 5,542,970; compounds 1 to 55 described on pages 7 to 17 of EP-A-682 088; compounds 1 to 14 shown in Example 1 to 6 of EP-A-194,885; compounds 1 to 24 described on pages 8 to 13 of EP-A-717 089; the compounds described in examples 1 to 16 in cols. 5 to 11 of U.S. Pat. No. 5,262,527; and the dyes described in Examples 1 to 21 in WO 94/16021.

Especially preferred water-soluble magenta dyes for use in the composition according to the second aspect of the invention include C.I. Acid Red 52, C.I. Acid Red 289 or a dye of the Formula (8), (9) and (10) and salts thereof:

Formula (8)

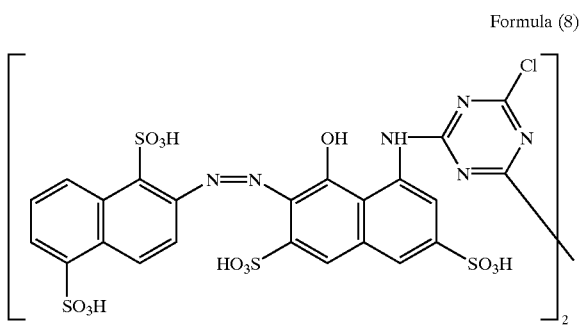

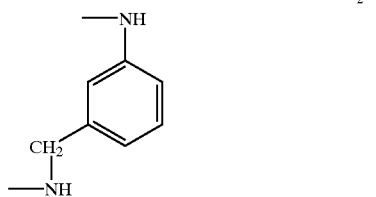

Formula (9)

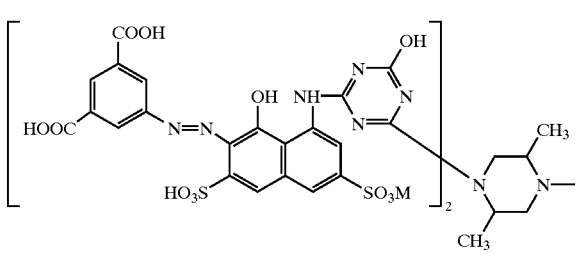

Formula (10)

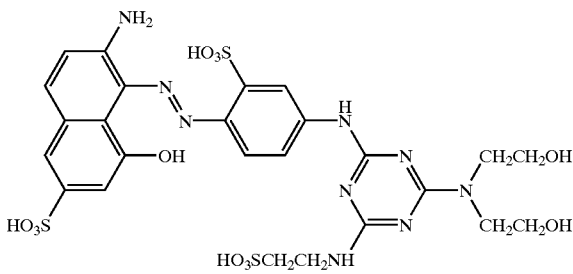

The dye of Formula (8) may be prepared using the method described in Example 1 of EP 0 559 310. The dye of the Formula (9) may be prepared using the method described in Example 3 of PCT publication number WO 94/16021. The dye of Formula (10) may be prepared using the method described in Example 1 of WO 96/24636.

The composition according to the second aspect of the present invention preferably comprises:

(a) from 1 to 99, more preferably from 3 to 70 and especially from 5 to 50 parts in total of the compound (s) according to the first aspect of the invention; and (b) from 99 to 1, more preferably from 30 to 97 parts and especially 95 to 50 parts in total of the water-soluble magenta dye(s);

wherein the parts are by weight and the sum of the parts (a)+(b)=100.

The composition may contain a single dye of Formula (1) or a mixture thereof. Similarly, the composition may contain a single water-soluble magenta dye or a mixture of two or more water-soluble magenta dyes.

The compounds and compositions according to the first and second aspects of the present invention may be, and preferably are, purified to remove undesirable impurities before they are incorporated into inks for ink jet printing. Conventional techniques may be employed for purification, for example ultrafiltration, reverse osmosis and/or dialysis.

According to a third aspect of the present invention there is provided an ink comprising:

(a) a compound according to the first aspect of the present invention, or a composition according to the second aspect of the invention; and (b) a liquid medium.

Preferably component (a) of the ink is one of the preferred compounds or compositions as hereinbefore described in relation to the first or second aspect of the invention. More preferably component (a) is one or more compounds of the Formula (1) or Formula (6) or salts thereof, as hereinbefore defined.

The liquid medium preferably comprises:

(i) water;

(ii) a mixture of water and an organic solvent; or (iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85,and more especially from 99 to 95 parts. The number of parts (a)+(b) is 100.

Preferably component (a) is completely dissolved in component (b). Preferably component (a) has a solubility in component (b) at 20° C. of at least 10%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Examples of further suitable ink media comprising a mixture of water and one or more organic solvents are described in U.S. Pat. No. 4,963,189, U.S. Pat. No. 4,703,113, U.S. Pat. No. 4,626,284, EP 425,150A and U.S. Pat. No. 5,207,824.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a compound or composition according to the first or second aspect of the invention;
(b) from 2 to 60, more preferably 5 to 40 parts of water-soluble organic solvent; and
(c) from 30 to 97, more preferably 40 to 85 parts water;
wherein all parts are by weight and the sum of the parts (a)+(b)+(c)=100.

When the liquid medium in the ink comprises a mixture of water and an organic solvent; or an organic solvent free from water, component (a) of the ink may comprise a compound of the Formula (A) as hereinbefore defined in relation to the first aspect of the invention.

The inks according to the present invention may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 11, more preferably from 7 to 10.

The viscosity of the ink at 25° C. is preferably less than 50 cP, more preferably less than 20 cP and especially less than 5 cP.

When the inks according to the invention are used as ink jet printing inks, the ink preferably has a concentration of less than 500 parts per million, more preferably less than 100 parts per million of halide ions. It is especially preferred that the ink has less than 100, more preferably less than 50 parts per million of divalent and trivalent metals, wherein parts refer to parts by weight relative to the total weight of the ink. We have found that purifying the inks to reduce the concentration of these undesirable ions reduces nozzle blockage in ink jet printing heads, particularly in thermal ink jet printers.

A fourth aspect of the present invention provides a process for printing an image on a substrate comprising applying thereto by means of an ink jet printer an ink containing a compound according to the first aspect of the invention, a composition according to the second aspect of the invention or a compound of the Formula (A) as hereinbefore defined in relation to the first aspect of the invention.

The ink used in this process is preferably as defined in the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fifth aspect of the present invention provides a substrate, preferably a paper, an overhead projector slide or a textile material, printed with an ink according to the third aspect of the present invention or by means of the process according to the fourth aspect of the present invention.

According to a sixth aspect of the present invention there is provided an ink jet printer cartridge comprising a chamber and ink, wherein the ink is present in the chamber and the ink contains a compound or a composition according to the first or second aspect of the invention. Preferably the ink is an ink according to the third aspect of the invention.

According to an eighth aspect of the present invention there is provided an ink jet printer containing an ink jet printer cartridge, wherein the ink jet printer cartridge is as defined in the seventh aspect of the present invention.

The invention is further illustrated by the following Examples in which all parts and percentages are by weight unless otherwise stated.

EXAMPLE 1

Dye (1)

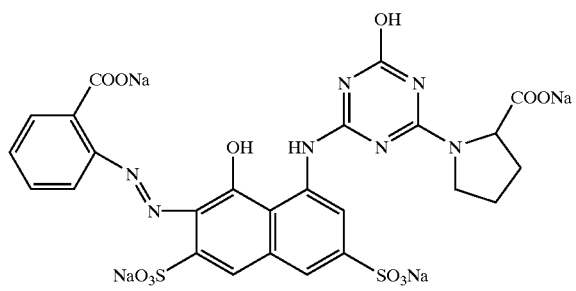

Dye (1)

Dye (1) was prepared according to stages (a) to (e):

Stage (a): Preparation of 1-Amino-7-(2'-carboxyphenylazo)-8-naphthol-3-,6-disulphonic Acid Anthranilic acid (18.34 g, 0.135 mol) and sodium nitrite (9.25 g, 0.134 mol) were dissolved in water (100 ml) at pH7 and added to conc. HCl (75 ml) at 5C. Excess nitrite was destroyed with a small amount of sulphamic acid. This was then added to a solution of N-acetyl H acid (74.3 g, 0.134 mol) in water (300 ml) at pH7. The pH was then raised to 7.5–8 and the reaction stirred overnight. The pH was then raised to 11.5–12 with conc. NaOH liquor and mixture heated at 85° C. for 2–3 hours. The pH was then lowered to 3 with conc. HCl and the product precipitated with the addition of sodium chloride. The solid precipitate was filtered off, slurried in acetone and dried to give the product (51% strength).

Stage (b)—Condensation With Cyanuric Chloride:

The product from stage (a) (10.8 g; 0.015 mol) was dissolved in water (400 mls) by addition of NaOH to pH 8.0. The mixture was cooled to <5° C. before adding cyanuric chloride (3.0 g; 0.0158 mol) in acetone (100 mls). The mixture was allowed to react for 1 hour before warming to room temperature. NaOH was then added to the mixture until a pH of 7.0 was reached in order to destroy excess cyanuric chloride.

Stage (i): Condensation With L-Proline

L-proline (1.9 g; 0.0165 mol) was added to the mixture in stage (b) and the pH adjusted to 8.0–8.5 with NaOH. The reaction was complete after approximately 2 hours at room temperature. (Confirmed by HPLC).

Stage (d) Hydrolysis

Sodium hydroxide (46–48%) was added to the mixture from stage (1) to raise pH to 12.0–12.5 and the mixture was heated to 85° C. for 12 hours. HCl was then added to adjust the pH to 1.0 and sodium chloride was added to approximately 15% w/w. The resulting precipitate was removed from the mixture by filtration.

Stage (e): Purification

The product from stage (d) was dissolved in a small amount of water and then re-precipitated into methylated spirit. The precipitate was isolated by filtration and dissolved in a small quantity of water. The mixture was then added to acetone and the resulting product isolated by filtration. The solid was dissolved in water with NaOH and the solution dialysed to low conductivity (<100 μs). The title product was then dried in an oven at 60° C.

EXAMPLE 2

Dyes (2) to (5) of the Formula (B) were prepared using an analogous process to that described in Example (1) except that in stage (i) in place of the L-proline was used the compound of the formula ZH shown in Table 1; and in stage (d) the hydrolysis was catalysed by the addition of approximately 1 g of DABCO:

Formula (B)

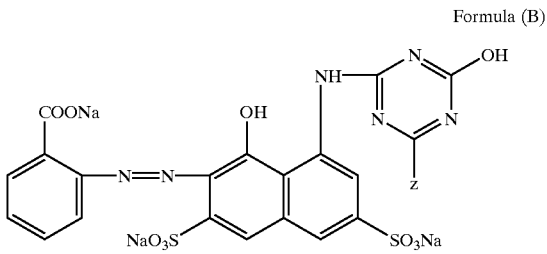

TABLE 1

| Dye | ZH |
|---|---|
| 2 | Pyrrolidine |
| 3 | 1,2,3,4-tetrahydroisoquinoline |
| 4 | 2,6-dimethylmorpholine |
| 5 | 3,5-dimethylpyrazole |

EXAMPLE 3

Dye 6

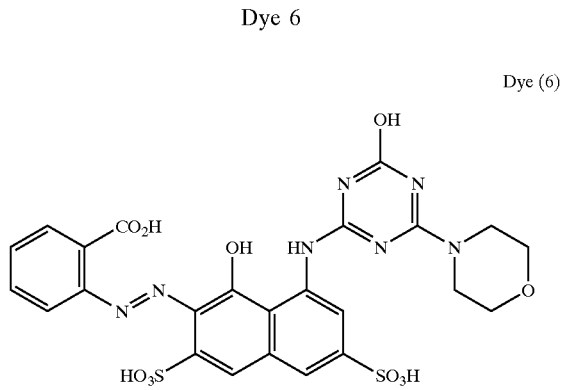

Dye 6 was prepared using an analogous process to that described in Example 1 except that in stage (i) morpholine was used in place of the L-proline and in stage (d) the hydrolysis was catalysed by the addition of DABCO. Analysis by mass spectrometry found m/z 646 (M–H)⁻. Requires $M^+=647$.

EXAMPLE 4

Dye 7

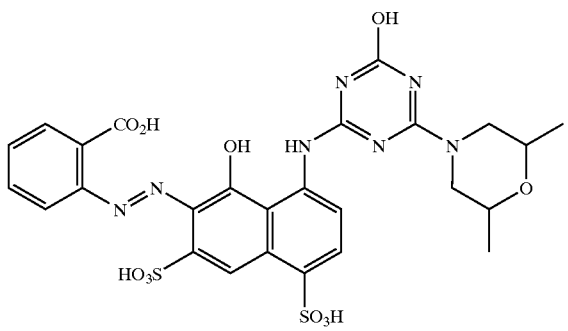

Dye 7 was prepared as in Example 1 except that in stage (a) in place of N-acetyl H-acid (N-acetyl-amino-8-naphthol 3:6-disulphonic acid) there was used N-acetyl K-acid (N-acetyl 1-amino-8-naphthol-4:6-disulphonic acid) and in stage (i) 2,6-dimethyl morpholine was used in place of L-proline and in stage (d) the hydrolysis was catalysed by the addition of DABCO. Analysis by mass spectrometry found m/z 674 (M–H)⁻. Requires $M^+=675$.

EXAMPLE 5

Dye 8

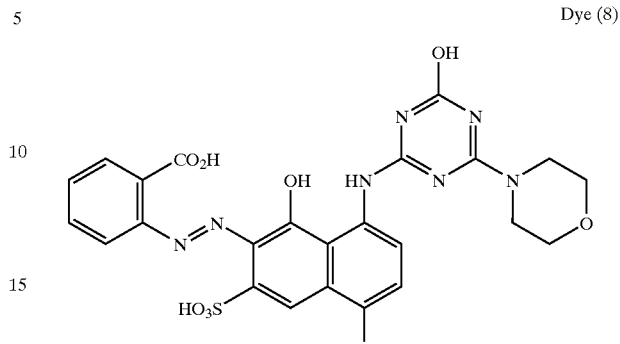

Dye 8 was prepared as for Dye 7 in Example 4 except that morpholine was used in place of 2,6-dimethyl morpholine. Analysis by mass spectrometry found m/z 646 (M–H)⁻. Requires $M^+=647$.

EXAMPLE 6

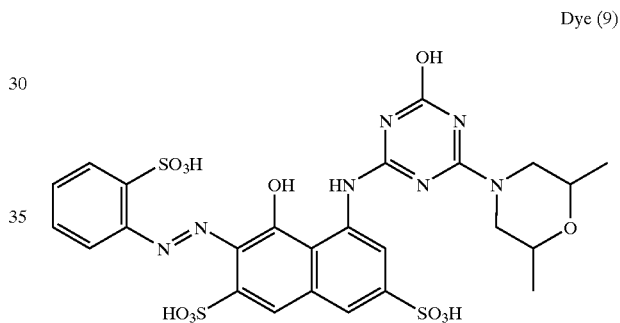

Dye 9 was prepared according to stages (a) to (e) below:
Stage (a): Preparation of 1-Amino-7-(2'-sulphophenylazo)-8-naphthol-3,6-disulphonic Acid Dye 9 was prepared using an analogous process to that described in Example 1 except that in stage (a) orthanilic acid (2-amino benzene sulphonic acid) was used in place of anthranilic acid.

Stage (b)—Condensation With Cyanuric Chloride:

The product from stage (a) (38.4 g; 0.05 mol) was dissolved in water (400 ml) by the addition of NaOH to pH 6.0. The mixture was cooled to <5° C. before adding cyanuric chloride (9.7 g; 1.05 mol) in acetone (100 ml). The mixture was allowed to react for 2 hours, then further cyanuric chloride (1.5 g) in acetone (15 ml) was added before warming to room temperature. The reaction was complete after stirring for a further 2 hours. Sodium chloride was then added and the precipitated solid filtered off, washed with brine, acetone and filtered off.

Stage (i): Condensation With 2,6-Dimethyl Morpholine 2,6-Dimethyl morpholine(2.87 g; 0.19 mol) was added to the solid (20 g) from stage (b) in water (250 mls) and stirred at pH 7.5–8.0. The reaction was complete after approximately 14 hours at room temperature (confirmed by HPLC). The reaction mixture was evaporated to a low volume, diluted with acetone (400 ml) and the precipitated solid filtered off and washed with acetone (100 mls).

Stace (d) Hydrolysis

Sodium hydroxide (46–48%) was added to the damp paste (32 g) from stage (i) in water (150 ml) to raise the pH to 12.0–12.5 and the mixture was heated to 80° C. for 7 hours. HCl was then added to adjust the pH to 8.5. The reaction mixture was concentrated to a low volume (50 ml) and acetone (400 ml). The resulting precipitate was removed from the mixture by filtration and washed with acetone.

Stage (e): Purification

The product from stage (d) was dissolved in water with NaOH and the solution dialysed to low conductivity (<100 μs). The title product was then dried in an oven at 60° C.

Analysis by mass spectrometry found m/z 732 (M–H+Na)⁻. Requires M⁺=711.

EXAMPLE 7

Dye 10

Dye 10 was prepared as in Example 6 above except that in stage (1) morpholine was used in place of 2,6-dimethyl morpholine. Found m/z 682 (M–H)⁻. Requires M⁺=711.

EXAMPLE 8

Dye 11

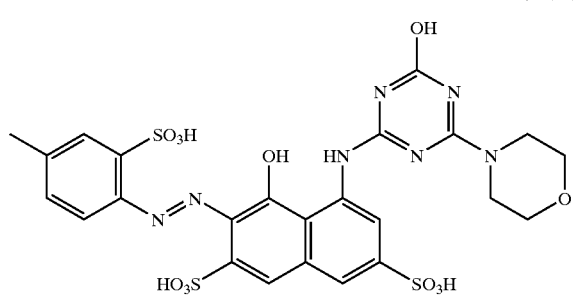

Dye (11)

Dye 11 was prepared using an analogous process to that described in Example 1 except that in stage (a) 2-amino-5-methylbenzene sulphonic acid was used in place of anthranilic acid and in stage (i) morpholine was used in place of L-proline and in stage (d) the hydrolysis was catalysed by the addition of DABCO. Analysis by mass spectrometry found m/z 696 (M–H)⁻. Requires M⁺=697.

EXAMPLE 9

Dye 12

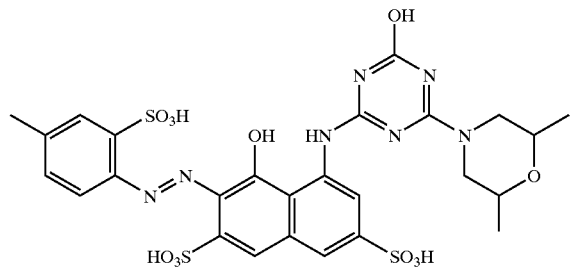

Dye (12)

Dye 12 was prepared using an analogous process to that described in Example 1 except that in stage (a) 2-amino-5-methylbenzene sulphonic acid was used in place of the anthranilic acid and in stage (i) 2,6-dimethyl morpholine was used in place of L-proline and in stage (d) the hydrolysis was catalysed by the addition of DABCO. Analysis by mass spectrometry found m/z 724 (M–H)⁻. Requires M⁺=725.

EXAMPLE 10

Dye 13

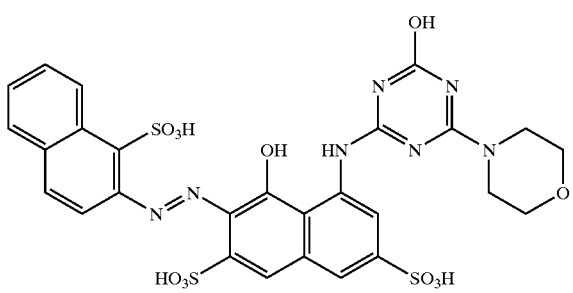

Dye (13)

Dye 13 was prepared using an analogous process to that described in Example 1 except that in stage (a) Tobias acid (2-napthylamine-1-sulphonic acid) was used in place of anthranilic acid and in stage (i) morpholine was used in place of L-proline and in stage (d) the hydrolysis was catalysed by the addition of DABCO. Analysis by mass spectrometry found m/z 732 (M–H)⁻. Requires M⁺=733.

EXAMPLE 11

Inks and Inkjet Printing

The dyes described in Examples 1 to 10 were formulated into inks by dissolving 3.5 parts of the dye in 96.5 parts of a medium (adjusted to pH 9.5 with ammonium hydroxide) comprising:

5 parts 2-pyrrolidone;

5 parts thiodiglycol 2 parts Surfynol 465 (a non-ionic surfactant available from Air Products Inc.); and 88 parts water.

The resulting solution was filtered through a 0.45 μm filter. When the dyes were incorporated into an ink medium and printed onto paper using an ink jet printer the resulting prints were a bright magenta shade which exhibited a high light-fastness.

EXAMPLE 12

Inks

The inks shown in tables 2, 3 and 4 may be prepared by dissolving the dye shown in columns 2 and 3 in the liquid medium shown in columns 4 to 14 by adjusting the pH of the ink to that indicated in the last column using a suitable base (for example NaOH). The resulting solution is then filtered to give the final ink.

The inks may be applied to paper by thermal or piezo ink jet printing.

The following abbreviations are used in Tables 2, 3 and 4:

PG = propylene glycol
NMP = N-methyl pyrrolidone
CYC = cyclohexanol
P12 = propane-1,2-diol
CET = cetyl ammonium bromide
TBT = tertiary butanol
GLY = glycerol
H-1,6 = Hexane 1,6-diol
DEG = diethylene glycol
TFP = 2,2,3,3-tetrafluoropropanol
2P = 2-pyrrolidone
UR = Urea
PHO = $Na_2HPO_4$ and
TDG = thiodiglycol
P-1,5 = Pentane-1,5-diol
CAP = caprolactone
CAP-L = caprolactam
EG = ethylene glycol
DEG-MBE = diethylene glycol monobutyl ether
PEG 200 = Polyethylene glycol (average molecular weight of 200)
TEA = triethanolamine
BUT = γ-butyrolactone

TABLE 2

| Ink | Dye | Dye Content | Water | PG | DEG | NMP | P-1,5 | TEA | CYC | BUT | CAP | EG | CAP-L | pH |
|---|---|---|---|---|---|---|---|---|---|---|---|---|---|---|
| 1 | 1 | 3.0 | 90 | | 5 | | 4.8 | 0.2 | | | | | | 8 |
| 2 | 2 | 10.0 | 85 | 3 | | | 3 | 3 | | 5 | | | | 9 |
| 3 | 2 | 2.1 | 91 | | 8 | | | | | | | 1 | 1 | 9.5 |
| 4 | 3 | 3.1 | 86 | 5 | | | | | 0.2 | 4 | | | 4.8 | 10 |
| 5 | 4 | 1.1 | 81 | | | 9 | | 0.5 | 0.5 | | | | | 11 |
| 6 | 5 | 2.5 | 60 | 4 | 15 | 3 | 3 | | | 6 | | 9 | 4 | 7.5 |
| 7 | 4 | 5 | 65 | | 20 | | 5 | | | 10 | 5 | | | 13 |
| 8 | 3 | 2.4 | 75 | 5 | 4 | | 5 | | | | 6 | | 5 | 12 |
| 9 | 3 | 4.1 | 80 | 3 | 5 | 2 | 9.7 | 0.3 | | | | | | 13 |
| 10 | 1 | 3.2 | 65 | | 5 | 4 | 6 | | | 5 | 4 | | 5 | 9 |
| 11 | 1 | 5.1 | 96 | | | | | | | 4 | 6 | | | 9 |
| 12 | 5 | 10.8 | 90 | 5 | | | | | | 5 | | | | 9 |
| 13 | 5 | 10.0 | 80 | 2 | 6 | 2 | 5 | | | 1 | | | | 9.5 |
| 14 | 3 | 1.8 | 80 | | 5 | | | | | | | 4 | | 8.5 |
| 15 | 5 | 2.6 | 84 | | | 11 | | | | | | 15 | | 9 |
| 16 | 5 | 3.3 | 80 | 2 | | | 10 | | | 2 | 5 | 6 | | 9 |
| 17 | 5 | 12.0 | 90 | | | 7 | | 0.3 | | 2.7 | | | | 10 |
| 18 | 2 | 5.4 | 69 | 2 | 20 | 2 | 1 | | | | | 3 | 3 | 11 |

TABLE 3

| Ink | Dye | Dye Content | Water | GLY | DEG | NMP | CET | TBT | TDG | UR | PHO | 2P | PI2 | pH |
|---|---|---|---|---|---|---|---|---|---|---|---|---|---|---|
| 19 | 1 | 3.0 | 80 | 15 | | | 0.2 | | | | | 4.8 | | 9 |
| 20 | 2 | 9.0 | 90 | | 5 | | | | | | 1.2 | | 5 | 9 |
| 21 | 3 | 1.5 | 85 | 5 | 3.8 | 5 | 0.16 | 4.64 | 0.2 | | | | | 10 |
| 22 | 4 | 2.5 | 90 | | | 6 | 3.88 | | | | 0.12 | | | 9.5 |
| 23 | 5 | 3.1 | 82 | 4 | | 8 | 0.3 | | | | | | 5.7 | 13 |
| 24 | 3 | 0.9 | 85 | | | 10 | | | | 4.8 | 0.2 | | | 12 |
| 25 | 2 | 8.0 | 90 | | | 4.7 | 5 | | 0.3 | | | | | 7.6 |
| 26 | 1 | 4.0 | 70 | | | 10 | 4 | | | 1 | | 4 | 11 | 8 |
| 27 | 2 | 2.2 | 75 | 4 | | 10 | 3 | | | 2 | | 6 | | 8.4 |
| 28 | 1 | 10.0 | 91 | | | 6 | | | | | | 3 | | 9.0 |
| 29 | 5 | 9.0 | 76 | | 9 | 7 | | 2.05 | | | 0.95 | 5 | | 9.4 |
| 30 | 3 | 5.0 | 78 | 5 | 11 | | | | | | | 6 | | 9.5 |
| 31 | 1 | 5.4 | 86 | | | 7 | | | | | | 7 | | 9 |
| 32 | 1 | 2.1 | 70 | 5 | 5 | 5 | 0.1 | 0.2 | 0.1 | 5 | 0.1 | 9.5 | | 10 |
| 33 | 3 | 2.0 | 90 | | | 10 | | | | | | | | 9.5 |
| 34 | 2 | 2 | 88 | | | 2 | | | 10 | | | | | 10.0 |
| 35 | 4 | 5 | 78 | | | 5 | | | 12 | | | 5 | | 11.5 |
| 36 | 2 | 8 | 70 | 2 | | 8 | | | 15 | | | 5 | | 8.5 |
| 37 | 1 | 10 | 80 | | | | | | 8 | | | 12 | | 9.5 |
| 38 | 4 | 10 | 80 | | 10 | | | | | | | | | 9.7 |

TABLE 4

| Ink | Dye | Dye Content | Water | PEG 200 | DEG-MBE | NMP | H-1,6 | TEA | TFP | BUT | CAP | EG | CAP-L | pH |
|---|---|---|---|---|---|---|---|---|---|---|---|---|---|---|
| 39 | 1 | 2.0 | 80 | 5 | | 6 | 4 | | | | | 5 | | 9.0 |
| 40 | 2 | 3.0 | 90 | | 5 | | 4.8 | 0.2 | | | | | | 10.0 |
| 41 | 3 | 10.0 | 85 | 3 | | | 3 | 3 | | 5 | | | 1 | 10.5 |
| 42 | 4 | 2.1 | 91 | | 8 | | | | | | | | 1 | 9.5 |
| 43 | 5 | 3.1 | 86 | 5 | | | | | 0.2 | 3.8 | | | 5 | 9.0 |
| 44 | 3 | 1.1 | 81 | | | 9 | | 0.5 | 0.5 | | | 9 | | 9.0 |

TABLE 4-continued

| Ink | Dye | Dye Content | Water | PEG 200 | DEG-MBE | NMP | H-1,6 | TEA | TFP | BUT | CAP | EG | CAP-L | pH |
|---|---|---|---|---|---|---|---|---|---|---|---|---|---|---|
| 45 | 1 | 2.5 | 60 | 4 | 15 | 3 | 3 | | | 6 | | 5 | 4 | 9.5 |
| 46 | 3 | 5 | 65 | | 20 | | | | | 10 | | | | 8.5 |
| 47 | 5 | 2.4 | 75 | 5 | 4 | | 5 | | | | 6 | | 5 | 11.5 |
| 48 | 5 | 4.1 | 80 | 3 | 5 | 2 | 9.7 | | 0.3 | | | | | 12 |
| 49 | 1 | 3.2 | 70 | | 5 | 4 | 6 | | | 5 | 4 | 6 | 5 | 9.0 |
| 50 | 1 | 5.1 | 96 | | | | | | | | 4 | | | 8.6 |
| 51 | 1 | 10.8 | 90 | 5 | | | | | | 5 | | | | 9.5 |
| 52 | 2 | 10.0 | 80 | 2 | 6 | 2 | 5 | | | 1 | | 4 | | 9.8 |
| 53 | 3 | 1.8 | 80 | | 5 | | | | | | | 15 | | 10.3 |
| 54 | 4 | 2.6 | 84 | | | 11 | | | | | | 5 | | 11 |
| 55 | 5 | 3.3 | 80 | 2 | | | 10 | | | | 2 | | 6 | 12 |
| 56 | 4 | 12.0 | 90 | | | | 7 | 0.3 | | 2.8 | | | | 9.0 |
| 57 | 2 | 5.4 | 69 | 2 | 20 | 2 | 1 | | | | | 3 | 3 | 9.0 |
| 58 | 2 | 6.0 | 91 | | | 4 | | | | | | 5 | | 9.5 |

What is claimed is:

1. A monoazo compound of the Formula (1) and salts thereof:

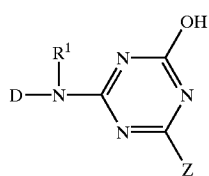

Formula (1)

wherein:

D is the residue of a mono-azo chromophore;

Z is an optionally substituted nitrogen containing heterocyclic group;

$R^1$ is H or optionally substituted alkyl;

the dyes of Formula (1) being free from fibre reactive groups;

provided that the compound of Formula (1) is other than the compound of Formula (A):

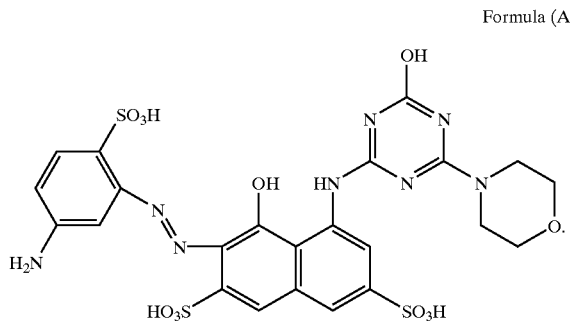

Formula (A)

2. A compound according to claim 1 wherein Z is attached to the triazine ring in Formula (1) by a bond to a nitrogen atom in the heterocyclic group.

3. A compound according to either claim 1 or claim 2 wherein Z is free from primary and secondary amino groups.

4. A compound according to claim 1 or claim 2 wherein the compound of Formula (1) is of the Formula (6) or a salt thereof:

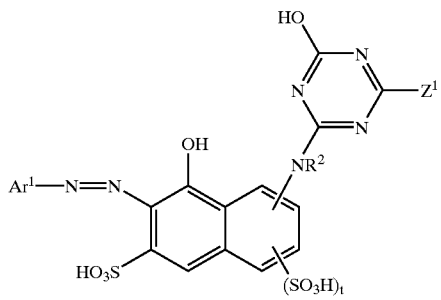

Formula (6)

wherein:

$Ar^1$ is optionally substituted phenyl or optionally substituted naphthyl;

$Z^1$ is an optionally substituted nitrogen containing heterocyclic group which is attached to the triazine ring by a bond to a nitrogen atom in the heterocyclic group;

$R^2$ is H or $C_{1-4}$-alkyl optionally substituted by —OH, —COOH or —$SO_3H$; and t is 0 or 1.

5. A composition comprising:

(a) one or more compounds according to claim 1; and (b) one or more water-soluble magenta dyes other than a compound according to (a).

6. An ink comprising:

(a) a compound according to claim 1; and (b) a liquid medium.

7. An ink comprising:

(a) a compound of the Formula (A) as defined in claim 1; and (b) a liquid medium comprising a mixture of water and an organic solvent; or an organic solvent free from water.

8. A process for printing an image on a substrate comprising applying thereto by means of an ink jet printer an ink comprising a compound according to claim 1.

9. A substrate printed with an ink according to claim 6 or claim 7.

10. An ink jet printer cartridge comprising a chamber and ink, wherein the ink is present in the chamber and the ink contains a compound according to claim 1.

11. An ink jet printer containing an ink jet printer cartridge, wherein the ink jet printer cartridge is as defined in claim 10.

12. An ink comprising:
(a) a composition according to claim 5; and
(b) a liquid medium.

13. A process for printing an image on a substrate comprising applying thereto by means of an ink jet printer an ink comprising a composition according to claim 5.

14. A process for printing an image on a substrate comprising applying thereto by means of an ink jet printer an ink comprising a compound of the Formula (A) as defined in claim 1.

15. A substrate printed with an ink according to claim 6 or claim 7 using an ink jet printer.

16. An ink jet printer cartridge comprising a chamber and ink, wherein the ink is present in the chamber and the ink contains a composition according to claim 5.

17. An ink jet printer containing an ink jet printer cartridge, wherein the ink jet printer cartridge is as defined in claim 16.

\* \* \* \* \*